United States Patent [19]
Tomim

[11] 4,438,299
[45] Mar. 20, 1984

[54] ON-LINE TELEPHONE TROUBLESHOOTING APPARATUS

[76] Inventor: William L. Tomim, 520 S. Green Oaks Ct., Addison, Ill. 60101

[21] Appl. No.: 352,645

[22] Filed: Feb. 26, 1982

[51] Int. Cl.³ .............................................. H04B 3/46
[52] U.S. Cl. ............................................... 179/175.3 F
[58] Field of Search ............... 179/175.3 F, 175.3 A, 179/175.3 R, 175.1 R, 175.25, 27 G, 19, 16 A, 16 AA, 1 MN, 175.2 C; 324/52

[56] References Cited
U.S. PATENT DOCUMENTS
4,373,121  2/1983  Sartori et al. ............... 179/175.3 F FOREIGN PATENT DOCUMENTS
1074933  4/1980  Canada ........................ 179/175.3 R Primary Examiner—Stafford D. Schreyer
Attorney, Agent, or Firm—John S. Fosse

[57] ABSTRACT

Telephone station isolating apparatus includes solid state components connected together in a termination circuit and a pair of cooperating control circuits. Each of the control circuits comprises a blocking diode and a reversely blocking silicon unilateral switch.

6 Claims, 1 Drawing Figure

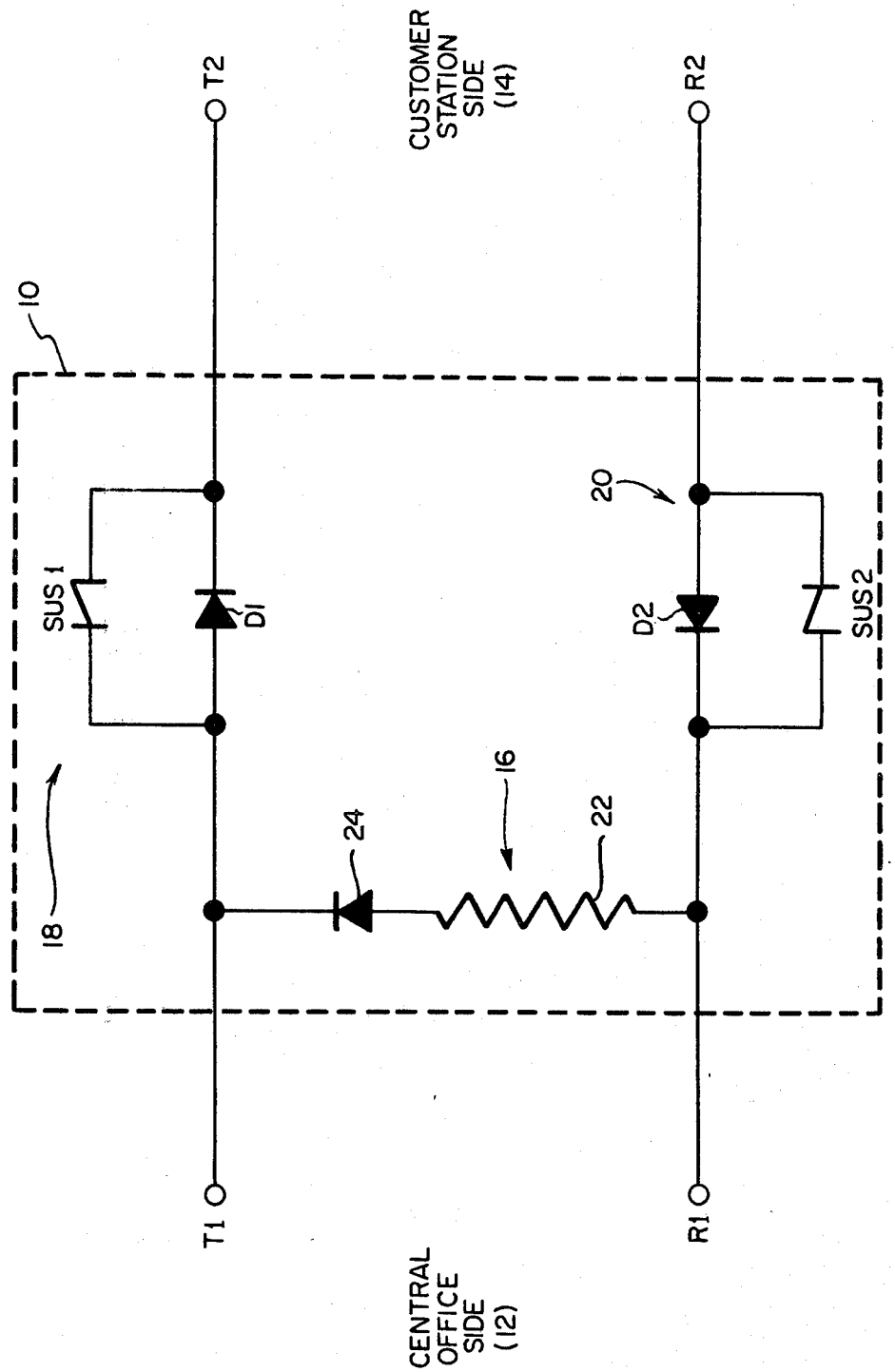

ON-LINE TELEPHONE TROUBLESHOOTING APPARATUS

FIELD OF THE INVENTION

This invention relates generally to the art of telecommunication equipment and more particularly to devices for distinguishing between subscriber and utility responsibilities for repairing telephone transmission faults.

BACKGROUND OF THE INVENTION

In the past, it was the general practice for a telephone utility company to own both the signal trunk lines leading to the customer's location and the telephone instrumentation installed at the customer's site. As a consequence, the utility company was ordinarily responsible for repairing system failures wherever they occurred. The modern trend is for the customer to own his telephone instruments and to have the concomitant responsibility for their proper functioning. Accordingly, it has become desirable to have means available for remote discrimination between failures which have occurred in the company-responsible portion of the system and those that have developed in the customer-responsible portion.

Heretofore, devices have been proposed which, when installed in the signal input to the customer location, afforded the capability of selectively and remotely disconnecting a given customer's station from the system trunk lines whereby to permit the accomplishment of a test procedure. These prior art station-isolation devices, however, have commonly incorporated mechanical relays and have uniformly operated on comparatively high, direct current potentials, on the order of 130 volts. These prior art devices have proved to be short-lived, unreliable and subject to spurious activation, as for example by the 130 volt direct current potential of such telecommunication services as coin-operated telephones.

SUMMARY OF THE INVENTION

The present invention overcomes the limitations of prior art station-isolating devices by providing a circuit arrangement of solid state components which operates on low voltage commands from the utility system "test desk" to distinguish between faults in the customer portion of the network and those in the company portion. The circuit arrangement of the invention is both economical and reliable and exhibits a very long use-life.

Therefore, a general object of the present invention is to provide new and improved apparatus for use in testing telephone circuitry for faults.

This and other objects and features of the invention pertain to the particular components and arrangements whereby the above object is attained.

BRIEF DESCRIPTION OF THE DRAWING

In order that the principle of the invention may be readily understood, one embodiment thereof, to which the application is not to be restricted, is shown in the accompanying drawing wherein the single FIGURE is a schematic circuit diagram showing an on-line troubleshooting device for use in a conventional telephone network.

DETAILED DESCRIPTION OF THE INVENTION

Referring now in detail to the single FIGURE of drawing, a troubleshooting device for use in selectively isolating a given customer station is indicated generally by the reference numeral 10, connected in electrical circuit across the "tip" line T1-T2 and the "ring" line R1-R2 and between the "central office" side 12 and the "customer station" side 14 of a telephone network. The isolating apparatus 10 generally comprises solid state electronic components which are electrically interconnected and suitably encapsulated in a mass of polyurethane or epoxy resin or other suitable potting compound and which are provided with electrical leads for making the illustrated connections.

The isolating apparatus 10 specifically comprises a termination circuit 16, a first control circuit 18 and a second control circuit 20. The termination circuit includes a termination resistor 22 of suitable value and a blocking diode 24 which are connected in electrical series with each other and in shunt circuit across the "tip" line T1-T2 and the "ring" line R1-R2, diode 24 being disposed for blocking conduction in the direction from the "tip" line to the "ring" line. Cooperatively, the first control circuit 18 is connected in series in the "tip" line T1-T2 between the termination circuit 16 and the customer station 14. The first control circuit includes a blocking diode D1 and a voltage-responsive selective-conduction device SUS1 which are connected in parallel with each other, with the diode D1 disposed for blocking conduction in the direction running generally from the customer station line 14. Similarly, the second control circuit 20 is arranged to be connected in series circuit in the "ring" line R1-R2 between the termination circuit 16 and the customer station line 14. This second control circuit likewise includes a blocking diode D2 and a voltage-responsive selective-conduction device SUS2 which are connected in parallel with each other, with the diode D2 disposed for blocking conduction in the direction from the central office line 12.

In compliance with the present invention, the devices SUS1 and SUS2 are selected to be silicon unilateral switches which totally block conduction in one direction and which block conduction in the opposite direction only at potentials up to some selected voltage, such as for example 10 volts direct current. It will be appreciated that each of the silicon unilateral switches SUS1 and SUS2 is arranged, in accord with the invention, for absolute blocking of conduction in the direction opposite to the direction of blocking effected by the companion diode.

For purposes of affording a more complete understanding of the invention, it is advantageous to provide at this juncture a functional description of the mode in which the component parts operate in a conventional telecommunication network.

Assuming that the apparatus 10 has been installed interjacent a given customer station in the manner shown in the drawing and assuming further that the customer has communicated a complaint to the telephone utility with regard to malfunction of his equipment, troubleshooting personnel at the utility "test desk" will first identify and gain circuit access to that customer location. The troubleshooter will then remove the conventional 50-volt central office battery potential from the telephone line to be examined; and in order to protect test meter equipment, the troubleshooter will test the potential first from "tip" to ground, then from "ring" to ground and finally from "tip" to "ring", this being done to avoid exposing delicate meters to the potentially adverse effect of a substantial induced alternating current voltage.

With the customer station in the "off hook" condition, the troublshooter will initiate test conditions by imposing a selected low test voltage, conveniently about 6 volts direct current across the trunk lines with the "tip" line T1 negative and the "ring" line R1 positive. In this mode, the diodes D1 and D2 are blocking, the diode 24 in the termination circuit is forward conducting, and the silicon unilaterial switches SUS1 and SUS2 are in the non-conducting state.

In the event that the "test desk" metering equipment displays an open circuit condition in this first mode, a failure in the company lines, as for example a broken line condition, will have been revealed.

On the other hand, if the "test desk" metering equipment reads only the value of the termination resistance 16, the test battery potential will then be reversed in polarity. A reading of an open circuit condition in this latter mode will establish that the "central office" side 12 of the network is operating acceptably.

Still further, should the "test desk" metering equipment read a resistance of lesser value than that of the termination resistor 16, when the "tip" line T1 is of negative polarity, a low resistance (short circuit) fault will have been revealed in the "central office" side. This fault will be confirmed by reversing the polarity of the "tip" and "ring" lines and finding a consequent reading only of the low resistance value of the short circuit fault in the "central office" line.

As will be appreciated, under normal operating conditions, the "tip" line T1 will be voltage positive and the "ring" line R1 will be of negative polarity and SUS1 and SUS2 will not conduct. Moreover, upon reversal of the line polarity under normal conditions the operation potential of 50 volts will convert both of the devices SUS1 and SUS2 to a forward-conducting condition whereby to permit normal operation of instrumentation on the "customer station" side 14.

While a particular embodiment of the invention has been shown and described, it should be understood that the invention is not limited thereto since many modifications may be made; and it is contemplated to cover by the present application any such modifications as they fall within the spirit and scope of the appended claims.

What is claimed is:

1. Telephone station isolating apparatus for electrical connection in circuit across the "tip" line and the "ring" line between the "central office" and the "customer station" sides of a telephone network in order to facilitate testing for faults, said apparatus comprising: termination circuit means including a termination resistor and a blocking diode connected in series with each other and arranged to be connected in shunt circuit across the "tip" and "ring" lines with the diode thereof disposed for blocking conduction in the direction from the "tip" to the "ring" line; first control circuit means arranged to be connected in series circuit in the "tip" line between said termination circuit means and the "customer station", said first control circuit means including a blocking diode and a voltage-responsive selective-conduction device connected in parallel with each other with the diode thereof disposed for blocking conduction in the direction from the "customer station"; and second control circuit means arranged to be connected in series circuit in the "ring" line between said termination circuit means and said "customer station" line, said second control circuit means for including a blocking diode and a voltage-responsive selective-conduction device connected in parallel with each other with the diode thereof disposed for blocking conduction in the direction from the "central office" line.

2. Apparatus according to claim 1 wherein said selective-conduction devices are arranged to switch from the non-conducting to the conducting state when impressed with a potential of at least about 10 volts, and a polarity the same as that of the potential which caused the diode to block conduction in the direction from the "customer station".

3. Apparatus according to claim 1 wherein said devices and said diodes are solid state electronic components.

4. Apparatus according to claim 3 wherein said devices are silicon unilateral switches and wherein said diodes are silicon diodes.

5. Telephone station isolating apparatus for electrical connection in circuit across the "tip" line and the "ring" line between the "central office" and the "customer station" sides of a telephone network in order to facilitate testing for faults, said apparatus comprising: termination circuit means arranged to be connected in shunt circuit across the "tip" and "ring" lines for imposing a predetermined electrical resistance across said lines and for selectively blocking conduction in the direction from said "tip" line to said "ring" line; first control circuit means arranged to be connected in series circuit in the "tip" line between said termination circuit means and the "customer station" for blocking conduction in the direction from said "customer station" in a reverse polarity test mode under conditions of potential less than a selected voltage and for being conductive for the condition of a potential greater than the selected voltage; the first control circuit being conductive at any potential of polarity opposite to that used in the reverse polarity test mode; and second control circuit means arranged to be connected in series circuit in the "ring" line between said termination circuit means and the "customer station" for blocking conduction in the direction from said "central office" line in the reverse polarity test mode under conditions of potential less than a selected voltage and for being conductive for the condition of a potential greater than the selected voltage; the second control circuit being conductive at any potential of polarity opposite to that used in the reverse polarity test mode.

6. Apparatus according to claim 5 wherein said test mode polarity is "ring" line positive and "tip" line negative.

* * * * *